United States Patent
Rogers et al.

(10) Patent No.: US 10,867,241 B1
(45) Date of Patent: Dec. 15, 2020

(54) SYSTEMS AND METHODS FOR COOPERATIVE MACHINE LEARNING ACROSS MULTIPLE CLIENT COMPUTING PLATFORMS AND THE CLOUD ENABLING OFF-LINE DEEP NEURAL NETWORK OPERATIONS ON CLIENT COMPUTING PLATFORMS

(71) Applicant: Clarifai, Inc., New York, NY (US)

(72) Inventors: John Rogers, New York, NY (US); Kevin Most, New York, NY (US); Matthew Zeiler, New York, NY (US)

(73) Assignee: Clarifai, Inc., New York, NY (US)

(*) Notice: Subject to any disclaimer, the term of this patent is extended or adjusted under 35 U.S.C. 154(b) by 602 days.

(21) Appl. No.: 15/276,655

(22) Filed: Sep. 26, 2016

(51) Int. Cl.
*H04L 29/06* (2006.01)
*G06N 5/04* (2006.01)
*G06Q 20/40* (2012.01)
*G06N 3/08* (2006.01)

(52) U.S. Cl.
CPC ............... *G06N 3/08* (2013.01); *H04L 67/42* (2013.01)

(58) Field of Classification Search
CPC .................................. G06N 3/08; H04L 67/42
USPC ........................................................ 706/1–62
See application file for complete search history.

(56) References Cited

U.S. PATENT DOCUMENTS

| 2015/0081543 A1* | 3/2015 | Brereton ............ G06Q 20/4016 |
| | | 705/44 |
| 2016/0350658 A1* | 12/2016 | Kedia ...................... G06N 5/04 |
| 2017/0366562 A1* | 12/2017 | Zhang ................. H04L 63/1416 |

* cited by examiner

*Primary Examiner* — Brandon S Cole
(74) *Attorney, Agent, or Firm* — Pillsbury Winthrop Shaw Pittman LLP

(57) ABSTRACT

Off-line deep neural network operations on client computing platforms may be enabled by cooperative machine learning across multiple client computing platforms and the cloud. A given client computing platform may include a client-side machine learning model configured to facilitate deep neural network operations on structured data. The operations may be performed by a client application installed on the given client computing platform. The client application may locally access the client-side machine learning model in order to perform the operations. Deep neural network operations on structured data may be performed at one or more servers. Sharing of model states may be facilitated between the cloud machine learning model and the client-side machine learning model. The cloud machine learning model may be improved, at one or more servers, based on usage of the application and user interactions with the given client computing platform.

18 Claims, 2 Drawing Sheets

SYSTEMS AND METHODS FOR COOPERATIVE MACHINE LEARNING ACROSS MULTIPLE CLIENT COMPUTING PLATFORMS AND THE CLOUD ENABLING OFF-LINE DEEP NEURAL NETWORK OPERATIONS ON CLIENT COMPUTING PLATFORMS

FIELD OF THE DISCLOSURE

This disclosure relates to systems and methods for cooperative machine learning across multiple client computing platforms and the cloud enabling off-line deep neural network operations on client computing platforms.

BACKGROUND

Deep neural networks have traditionally been run on very fast computers with expensive graphics cards, due to their voracious appetite for computing power. Currently, however, it is difficult for mobile developers to use this technology. For example, there are few implementations for mobile, many of the models are too big, and the implementations are not easy to use. Existing approaches use cloud machine learning APIs, but these suffer from very high latency.

SUMMARY

Exemplary implementations disclosed herein may allow mobile applications to use deep learning to understand structured data like images, video, audio, and text. In particular, exemplary implementations enable real-time applications of machine learning on mobile devices due to low latency facilitated by sharing of models between users. Exemplary implementations also solve issues related to siloing. For example, mobile developers may want to use feedback from users to develop smart models. If there is no cloud for centralized learning, every model trained by a user will be only as good as that user has made it. With a central cloud, users can collaborate to train much smarter models, as well as sharing new ones between devices. This may enable a whole host of new applications and features for mobile developers.

Accordingly, one aspect of the disclosure relates to a system configured for cooperative machine learning across multiple client computing platforms and the cloud enabling off-line deep neural network operations on client computing platforms. The system may comprise one or more hardware processors configured by machine-readable instruction components. The components may comprise a communications component, a cloud neural network component, a synchronization component, a cloud learning component, and an optimization component. The communications component may be configured to facilitate communications between one or more client computing platforms and one or more servers. The one or more client computing platforms may include a first client computing platform. The first client computing platform may include a client-side machine learning model configured to facilitate deep neural network operations on structured data. The operations may be performed by a client application installed on the first client computing platform. The client application may locally access the client-side machine learning model in order to perform the operations. The cloud neural network component may include a cloud machine learning model configured to facilitate deep neural network operations on structured data. The synchronization component may be configured to facilitate sharing of model states between the cloud machine learning model and the client-side machine learning model. The cloud learning component may be configured to improve the cloud machine learning model based on usage of the application and user interactions with the first client computing platform. The optimization component may be configured to determine workflows between one or more client computing platforms and one or more servers that chain multiple machine learning models.

Another aspect of the disclosure relates to a method for cooperative machine learning across multiple client computing platforms and the cloud enabling off-line deep neural network operations on client computing platforms. The method may be performed by one or more hardware processors configured by machine-readable instructions. The method may include facilitating, at one or more servers, communications between one or more client computing platforms and one or more servers. The one or more client computing platforms may include a first client computing platform. The first client computing platform may include a client-side machine learning model configured to facilitate deep neural network operations on structured data. The operations may be performed by a client application installed on the first client computing platform. The client application may locally access the client-side machine learning model in order to perform the operations. The method may include facilitating, at one or more servers, deep neural network operations on structured data. The method may include facilitating, at one or more servers, sharing of model states between the cloud machine learning model and the client-side machine learning model. The method may include improving, at one or more servers, the cloud machine learning model based on usage of the application and user interactions with the first client computing platform. The method may include determining, at one or more servers, workflows between one or more client computing platforms and one or more servers that chain multiple machine learning models.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
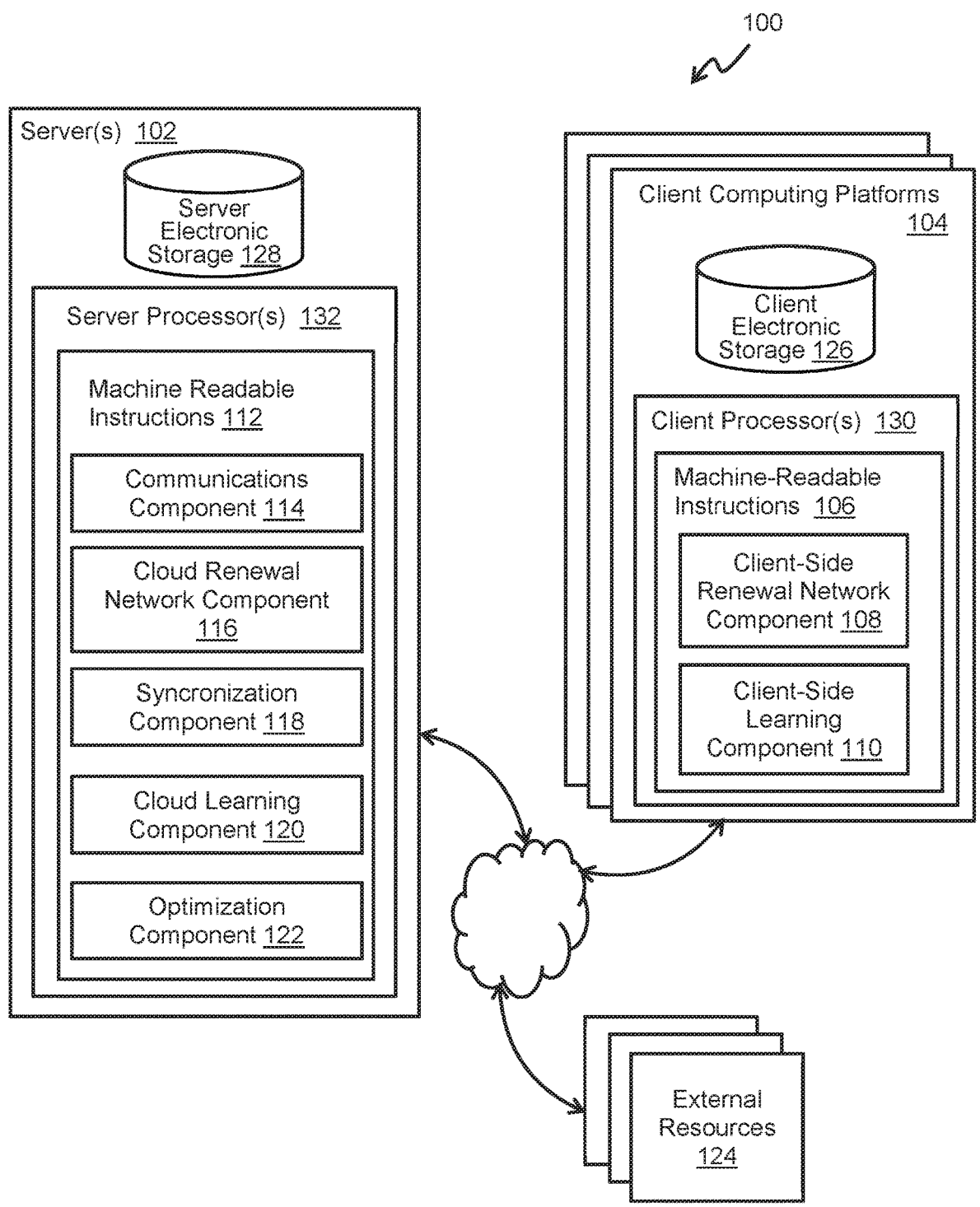
FIG. 1 illustrates a system configured for cooperative machine learning across multiple client computing platforms and the cloud enabling off-line deep neural network operations on client computing platforms, in accordance with one or more implementations.

FIG. 1 illustrates a system configured for cooperative machine learning across multiple client computing platforms and the cloud enabling off-line deep neural network operations on client computing platforms, in accordance with one or more implementations. In some implementations, system 100 may include one or more server 102. The server(s) 102 and client computing platforms 104 may be configured to communicate according to a client/server architecture, a peer-to-peer architecture, and/or other architectures. The users may access system 100 via client computing platform(s) 104.

The client computing platform(s) 104 may be configured to execute machine-readable instructions 106. The machine-readable instructions 106 may include one or more of a client-side neural network component 108, a client-side learning component 110, and/or other components.

The client-side neural network component 108 may include a client-side machine learning model configured to facilitate deep neural network operations on structured data. The structured data may include one or more of images, images within images, symbols, logos, objects, video, audio, text, and/or other structured data. The deep neural network operations may relate to deep learning, deep structured learning, hierarchical learning, deep machine learning, and/or other types of machine learning. In some implementations, a deep neural network operation may include a set of algorithms that attempt to model high level abstractions in data by using a deep graph with multiple processing layers, composed of multiple linear and/or non-linear transformations.

The deep neural network operations may be performed by a client application installed on a given client computing platform 104. The client application may include a software application designed to run on the given client computing platform 104. The client application may locally access the client-side machine learning model in order to perform the deep neural network operations. These operations may occur at very low latency because they are embedded on the client computing platform(s) 104, as opposed to running in the cloud.

In some implementations, the client-side neural network component 108 may be embedded in the client application installed on the given client computing platform 104. In some implementations, the application may access the client-side neural network component 108 stored locally on the given client computing platform 104. In some implementations, the client-side neural network component 108 may include a code library enabling the deep neural network operations. In some implementations, the client-side neural network component 108 may include multiple client-side learning models such that an arbitrary workflow can be applied to determine desired outputs.

The client-side learning component 110 may be configured to improve the client-side machine learning model based on one or more of new model states received from other locations in system 100 (described further below), usage of the application, user interactions with the given client computing platform 104, one or more other client computing platforms 104, and/or other information. According to some implementations, sharing of information beyond model states may facilitate learning for a distributed machine learning model from multiple client computing platform(s) 104 and/or server(s) 102.

In some implementations, the client-side learning component 110 may be configured to improve the client-side machine learning model in real time or near-real time. In some implementations, learning from this data may occur in a software developer kit (SDK). The SDK may provide a low latency and no-wireless-network-connection capability to recognize new things in the world. In some implementations, learning may occur on an application programing interface (API) platform to benefit from data provided from multiple client computing platforms (104) and/or other API platform users.

The server(s) 102 may be configured to execute machine-readable instructions 112. The machine-readable instructions 112 may include one or more of a communications component 114, a cloud neural network component 116, a synchronization component 118, a cloud learning component 120, an optimization component 122, and/or other components.

The communications component 114 may be configured to facilitate communications between client computing platform(s) 104 and server(s) 102.

The cloud neural network component 116 may include a cloud machine learning model configured to facilitate deep neural network operations on structured data. These deep neural network operations may be the same as or similar to the ones facilitated by the client-side machine learning model described in connection with client-side neural network component 108.

The synchronization component 118 may be configured to facilitate sharing of information between the cloud machine learning model and the client-side machine learning model. Such information may include model states of the cloud machine learning model and/or the client-side machine learning model. The machine model states may include machine model parameters. In some implementations, the sharing of model states occurs on a periodic basis. In some implementations, the sharing of model states occurs responsive to the client computing platform 104 coming online. The synchronization component 118 may be configured to facilitate sharing of model states between different client-side machine learning models embodied at different client computing platform(s) 104.

The synchronization component 118 may be configured to facilitate sharing of information beyond the model states between the cloud machine learning model and the client-side machine learning model. Such information beyond the model states may include one or more of images, images within images, symbols, logos, objects, tags, videos, audio, geolocation, accelerometer data, metadata, and/or other information. In some implementations, sharing of information beyond the model states may be subject to end user consent. In some implementations, sharing of some information beyond the model states may be one-way sharing from the client computing platform 104.

The cloud learning component 120 may be configured to improve the cloud machine learning model. Such improvements may be made based on one or more of new model states received from other locations in system 100 such as client computing platform(s) 104, usage of the application, user interactions with client computing platform(s) 104, and/or other information. In some implementations, the cloud learning component 120 may be configured to improve the cloud machine learning model in real time or near-real time.

In some implementations, advertisements may be pushed to individual client computing platforms 104 based on the cloud machine learning model and/or other information received from client computing platform(s) 104.

The optimization component 122 may be configured to determine workflows between a given client computing platform 104, one or more other client computing platforms 104, and/or server(s) 102 that chain multiple machine learning models. In some implementations, the workflows may be determined in an arbitrary graph. In some implementations, the workflow determination may be based on one or more of availability of network connection, network bandwidth, latency, throughput, number of concepts recognized by the machine learning models, importance of low latency, importance of high accuracy, user's preferences, preferences associated with the given client computing platform 104, and/or other information.

By way of non-limiting example, for a company, a set of cooperating client computing platforms 104 may be those of the company's users. For individual ones of those client computing platforms 104, the company may obtain an understanding of the type of data their users encounter in the world.

As another illustrative example, using her client computing platform 104 (e.g., mobile phone), a user may be able to train a machine learning model of her pet inside her home. That specific machine learning model may be pushed to server(s) 102. The machine learning model may be deployed to run on the user's webcam to process live feeds of video in order to find any frames of video that contain her pet. This data may be reported as all video frames sent back to server(s) 102. This data may be reported as select video frames depending on the recognition of the pet. This data may serve as analytical data (e.g., the fraction of frames where your pet was recognized).

Another non-limiting example may involve deploying recognition of the same concept to multiple devices for surveillance. A machine learning model could be trained to recognize a concept, and then be deployed immediately so the data from each video frame could be fed back to a centralized dashboard via client computing platform(s) 104 and/or server(s) 102 to alert when the desired concepts are recognized.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include electronic storage 126, one or more processors 130 configured to execute machine-readable instructions, and/or other components. The machine-readable instructions may be configured to enable a user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information, hosts and/or providers of machine learning outside of system 100, external entities participating with system 100, and/or other resources. In some implementations, some or all of the functionality attributed herein to external resources 124 may be provided by resources included in system 100.

Server(s) 102 may include electronic storage 128, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 and 128 may comprise non-transitory storage media that electronically stores information. The electronic storage media of electronic storage 126 may include one or both of system storage that is provided integrally (i.e., substantially non-removable) with a given client computing platform 104 and/or removable storage that is removably connectable to the given client computing platform 104 via, for example, a port (e.g., a USB port, a firewire port, etc.) or a drive (e.g., a disk drive, etc.). The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 and 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 126 and 128 may store software algorithms, information determined by processor(s) 126 and 128, information received from server(s) 102, information received from client computing platform(s) 104, and/or other information that enables server(s) 102 and client puttinging platform(s) 104 to function as described herein.

Processor(s) 130 may be configured to provide information processing capabilities in client computing platform(s) 104. Processor(s) 132 may be configured to provide information processing capabilities in server(s) 102. As such, processor(s) 130 and 132 may include one or more of a digital processor, an analog processor, a digital circuit designed to process information, an analog circuit designed to process information, a state machine, and/or other mechanisms for electronically processing information. Although processor(s) 130 and 132 are shown in FIG. 1 as single entities, this is for illustrative purposes only. In some implementations, processor(s) 130 and 132 may each include a plurality of processing units. For example, processor(s) 132 may represent processing functionality of a plurality of servers operating in coordination. The processor(s) 130 and/or 132 may be configured to execute machine-readable instruction components 108, 110, 114, 116, 118, 120, 122, and/or other machine-readable instruction components. The processor(s) 130 and/or 132 may be configured to execute machine-readable instruction components 108, 110, 114, 116, 118, 120, 122, and/or other machine-readable instruction components by software; hardware; firmware; some combination of software, hardware, and/or firmware; and/or other mechanisms for configuring processing capabilities on processor(s) 130 and/or 132.

It should be appreciated that although machine-readable instruction components 108, 110, 114, 116, 118, 120, and 122 are illustrated in FIG. 1 as being implemented within single processing units, in implementations in which processor(s) 130 and/or 132 include multiple processing units, one or more of machine-readable instruction components 108, 110, 114, 116, 118, 120, and/or 122 may be implemented remotely from the other components and/or subcomponents. The description of the functionality provided by the different machine-readable instruction components 108, 110, 114, 116, 118, 120, and/or 122 described herein is for illustrative purposes, and is not intended to be limiting, as any of machine-readable instruction components 108, 110, 114, 116, 118, 120, and/or 122 may provide more or less functionality than is described. For example, one or more of machine-readable instruction components 108, 110, 114, 116, 118, 120, and/or 122 may be eliminated, and some or all of its functionality may be provided by other ones of machine-readable instruction components 108, 110, 114, 116, 118, 120, and/or 122. As another example, processor(s) 130 and/or 132 may be configured to execute one or more additional machine-readable instruction components that may perform some or all of the functionality attributed below to one of machine-readable instruction components 108, 110, 114, 116, 118, 120, and/or 122.

Figure 2:
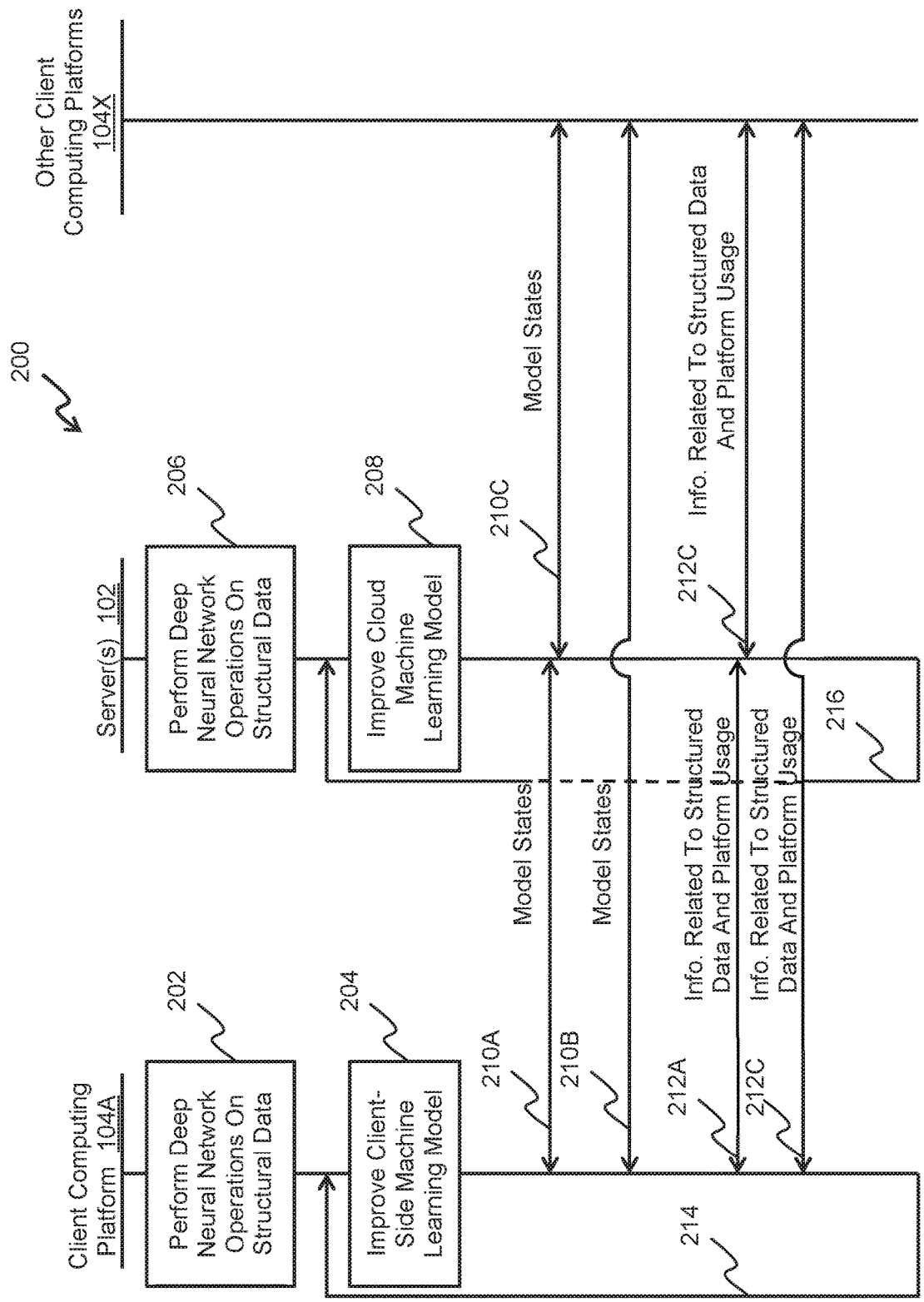
FIG. 2 illustrates a method for cooperative machine learning across multiple client computing platforms and the cloud enabling off-line deep neural network operations on client computing platforms, in accordance with one or more implementations.

FIG. 2 illustrates a method 200 for cooperative machine learning across multiple client computing platforms and the cloud enabling off-line deep neural network operations on client computing platforms, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a client computing platform 104A may perform deep neural network operations on structured data. The structured data may include one or more of images, images within images, symbols, logos, objects, video, audio, text, and/or other structured data obtained by or stored by the client computing platform 104A. The deep neural network operations may be performed by a client application installed on the client computing platform 104A. The client application may locally access the client-side machine learning model in order to perform the deep neural network operations. Operation 202 may be performed by one or more hardware processors configured to execute a machine-readable instruction component that is the same as or similar to client-side neural network component 108 (as described in connection with FIG. 1), in accordance with one or more implementations.

At an operation 204, the client computing platform 104A may improve the client-side machine learning model based on one or more of new model states received from other locations in system 100, usage of the application, user interactions with the given client computing platform 104, and/or other information. Operation 204 may be performed by one or more hardware processors configured to execute a machine-readable instruction component that is the same as or similar to client-side learning component 110 (as described in connection with FIG. 1), in accordance with one or more implementations.

At an operation 206, server(s) 102 may perform deep neural network operations on structured data. These deep neural network operations may be the same as or similar to the ones facilitated by the client-side machine learning model described in connection with client-side neural network component 108. Operation 206 may be performed by one or more hardware processors configured to execute a machine-readable instruction component that is the same as or similar to cloud neural network component 116 (as described in connection with FIG. 1), in accordance with one or more implementations.

At an operation 208, server(s) 102 may improve the cloud machine learning model. Such improvements may be made based on one or more of new model states received from other locations in system 100, usage of the application, user interactions with client computing platform(s) 104, and/or other information. Operation 208 may be performed by one or more hardware processors configured to execute a machine-readable instruction component that is the same as or similar to cloud learning component 120 (as described in connection with FIG. 1), in accordance with one or more implementations.

At operations 210A, 2108, and/or 210C, information may be shared between the cloud machine learning model and the client-side machine learning model. Such information may include model states of the cloud machine learning model and/or the client-side machine learning model. The machine model states may include machine model parameters. The sharing may occur between client computing platform 104A, server(s) 102, and/or other client computing platform(s) 104X. Operations 210A, 210B, and/or 210C may be performed by one or more hardware processors configured to execute a machine-readable instruction component that is the same as or similar to synchronization component 118 (as described in connection with FIG. 1), in accordance with one or more implementations.

At operations 212A, 212B, and/or 212C, information beyond the model states may be shared between the cloud machine learning model and the client-side machine learning model. Such information beyond the model states may include one or more of images, images within images, symbols, logos, objects, tags, videos, audio, geolocation, accelerometer data, metadata, and/or other information. In some implementations, sharing of information beyond the model states may be subject to end user consent. The sharing may occur between client computing platform 104A, server(s) 102, and/or other client computing platform(s) 104X. In some implementations, sharing of some information beyond the model states may be one-way sharing from the client computing platform 104. Operations 212A, 212B, and/or 212C may be performed by one or more hardware processors configured to execute a machine-readable instruction component that is the same as or similar to synchronization component 118 (as described in connection with FIG. 1), in accordance with one or more implementations.

Operations 214 and 216 illustrate that the learning processes of system 100 can be recursive.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating off-line training of machine learning models deployed locally on mobile computing devices and cooperative training of machine learning models deployed across multiple computing devices, the system comprising:
   a mobile computing device comprising one or more processors programmed with computer program instructions that, when executed, cause the mobile computing device to:
   access a client-side machine learning model deployed locally on the mobile computing device;
   obtain training information and provide the training information as input to the client-side machine learning model to train the client-side machine learning model, the client-side machine learning model being trained based on the training information when the mobile computing device is offline, wherein training the client-side machine learning model includes determining model parameters of the client-side machine learning model based on the training information;
   obtain, when the mobile computing device is online, model parameters of another machine learning model deployed on another computing device, the other machine learning model being trained based on other training information obtained by the other computing device and the model parameters of the other machine learning model being determined based on the other training information; and
   update the model parameters of the client-side machine learning model based on the model parameters of the other machine learning model.

2. The system of claim 1, wherein the one or more processors cause the mobile computing device to:
   share, when the mobile computing device is online, the model parameters of the client-side machine learning model with the other computing device, the model parameters of the client-side machine learning model indicating a model state of the client-side machine learning model,
   wherein the model parameters of the other machine learning model of the other computing device is updated based on the model parameters of the client-side machine learning model.

3. The system of claim 1, wherein the one or more processors cause the mobile computing device to share the model parameters of the client-side machine learning model with the other computing device in response to the other computing device coming online.

4. The system of claim 1, wherein the one or more processors cause the mobile computing device to further update the model parameters of the client-side machine learning model based on the other training information from the other computing device, wherein the training information and the other training information comprise images, images within images, symbols, logos, objects, tags videos, audio, text, geolocation, accelerometer data, or metadata.

5. The system of claim 1, wherein the one or more processors cause the mobile computing device to further update the model parameters of the client-side machine learning model based on usage of an application on the mobile computing device, user interaction with the mobile computing device, or other training information obtained from other computing devices.

6. The system of claim 1, wherein the one or more processors cause the mobile computing device to obtain the other training information from the other computing device in response to the mobile computing device coming online.

7. The system of claim 1, wherein the one or more processors cause the mobile computing device to determine a workflow between the mobile computing device and the other computing device based on availability of a network connection, network bandwidth, latency, throughput, number of concepts recognized by the client-side machine learning model and the other machine learning model, accuracy, user's preferences, or preferences associated with the mobile computing device and the other computing device.

8. The system of claim 1, wherein the training information is obtained from a memory of the mobile computing device.

9. The system of claim 1, wherein the one or more processors cause the mobile computing device to update the model parameters of the client-side machine learning model in real time or near-real time.

10. A method for facilitating off-line training of machine learning models deployed locally on mobile computing devices and cooperative training of machine learning models deployed across multiple computing devices, the method comprising:
    accessing, by one or more processors, a client-side machine learning model deployed locally on a mobile computing device;
    obtaining, by the one or more processors, training information and providing, by the one or more processors, the training information as input to the client-side machine learning model to train the client-side machine learning model, the client-side machine learning model being trained based on the training information when the mobile computing device is offline;
    obtaining, by the one or more processors, when the mobile computing device is online, model parameters of another machine learning model deployed on another computing device, the other machine learning model being trained based on other training information obtained by the other computing device; and
    updating, by the one or more processors, model parameters of the client-side machine learning model based on the model parameters of the other machine learning model.

11. The method of claim 10, further comprising:
    sharing, when the mobile computing device is online, the model parameters of the client-side machine learning model with the other computing device, the model parameters of the client-side machine learning model indicating a model state of the client-side machine learning model, wherein the model parameters of the other machine learning model of the other computing device is updated based on the model parameters of the client-side machine learning model.

12. The method of claim 10, wherein the mobile computing device shares the model parameters of the client-side machine learning model with the other computing device in response to the other computing device coming online.

13. The method of claim 10, further comprising:

updating the model parameters of the client-side machine learning model based on the other training information from the other computing device, wherein the training information and the other training information comprise images, images within images, symbols, logos, objects, tags videos, audio, text, geo-location, accelerometer data, or metadata.

14. The method of claim 10, further comprising:

updating the model parameters of the client-side machine learning model based on usage of an application on the mobile computing device, user interaction with the mobile computing device, or other training information obtained from other computing devices.

15. The method of claim 10, further comprising:

obtaining the other training information from the other computing device in response to the mobile computing device coming online.

16. The method of claim 10, further comprising:

determining a workflow between the mobile computing device and the other computing device based on availability of a network connection, network bandwidth, latency, throughput, number of concepts recognized by the client-side machine learning model and the other machine learning model, accuracy, user's preferences, or preferences associated with the mobile computing device and the other computing device.

17. The method of claim 10, wherein the training information is obtained from a memory of the mobile computing device.

18. The method of claim 10, wherein the model parameters of the client-side machine learning model is updated in real time or near-real time.

\* \* \* \* \*